(12) United States Patent
Zhou

(10) Patent No.: US 10,656,675 B2
(45) Date of Patent: May 19, 2020

(54) VIRTUAL REALITY HELMET AND VIRTUAL REALITY SYSTEM

(71) Applicant: GoerTek Technology Co., Ltd., Qingdao, Shandong Province (CN)

(72) Inventor: Kai Zhou, Qingdao (CN)

(73) Assignee: GOERTEK TECHNOLOGY CO., LTD., Qingdao (CN)

(*) Notice: Subject to any disclaimer, the term of this patent is extended or adjusted under 35 U.S.C. 154(b) by 0 days.

(21) Appl. No.: 16/301,418

(22) PCT Filed: Dec. 31, 2016

(86) PCT No.: PCT/CN2016/114053
§ 371 (c)(1),
(2) Date: Nov. 13, 2018

(87) PCT Pub. No.: WO2018/045690
PCT Pub. Date: Mar. 15, 2018

(65) Prior Publication Data
US 2019/0294210 A1  Sep. 26, 2019

(30) Foreign Application Priority Data
Sep. 6, 2016  (CN) .......................... 2016 1 0805881

(51) Int. Cl.
*G06F 1/16* (2006.01)
*G02B 27/01* (2006.01)
*H04W 4/80* (2018.01)
*H04W 76/10* (2018.01)
*H04N 21/4363* (2011.01)

(52) U.S. Cl.
CPC ............. *G06F 1/163* (2013.01); *G02B 27/01* (2013.01); *H04N 21/43635* (2013.01); *H04W 4/80* (2018.02); *H04W 76/10* (2018.02)

(58) Field of Classification Search
CPC ................................ G02B 27/01; G06F 3/011
See application file for complete search history.

(56) References Cited

U.S. PATENT DOCUMENTS

2015/0070386 A1* 3/2015 Ferens .................... G06F 3/011
                                                          345/633
2017/0011706 A1* 1/2017 Namkung .............. G09G 5/006

FOREIGN PATENT DOCUMENTS

| CN | 203405631 U | * | 1/2014 |
| CN | 203444168 U |   | 2/2014 |
| CN | 204989643 U |   | 1/2016 |

(Continued)

*Primary Examiner* — Laurence J Lee
(74) *Attorney, Agent, or Firm* — Fox Rothschild LLP; Carol E. Thorstad-Forsyth

(57) ABSTRACT

A virtual reality helmet (300) and a virtual reality system (500) are disclosed. The virtual reality helmet comprises a helmet body (100) and an optical system (110), and the optical system is provided within the helmet body. The helmet body is provided with a detachable display screen (200). In operation, the display screen is snap-fitted to the helmet body, connects to an external video playing device (400) via a video transmission line, and displays the video data played by the video playing device. The optical system is configured to image a light emitted by the display screen. The video playing device is not attached to the helmet body, which reduces the weight worn on the head, and long-term usage does not easily cause neck fatigue.

6 Claims, 1 Drawing Sheet

(56) References Cited

FOREIGN PATENT DOCUMENTS

| | | |
|---|---|---|
| CN | 205301711 U | 6/2016 |
| CN | 106226908 A | 12/2016 |
| CN | 206115035 U | 4/2017 |

* cited by examiner

VIRTUAL REALITY HELMET AND VIRTUAL REALITY SYSTEM

CROSS REFERENCE TO RELATED APPLICATIONS

This application is a U.S. National Stage entry under 35 U.S.C. § 371 based on International Application No. PCT/CN2016/114053, filed on Dec. 31, 2016, which was published under PCT Article 21(2) and which claims priority to Chinese Patent Application No. 201610805881.3, filed on Sep. 6, 2016. The disclosure of the priority applications are hereby incorporated herein in their entirety by reference.

TECHNICAL FIELD

The present disclosure relates to the technical field of virtual reality, and particularly relates to a virtual reality helmet and a virtual reality system.

BACKGROUND

Along with the popularization of virtual reality (VR) technique, currently in the market there are mainly two types of virtual reality helmets. One type mainly cooperates with a mobile phone, the headpiece has a built-in optical system, and in operation, the mobile phone is placed within the headpiece, and videos are watched via the optical system and the screen of the mobile phone, to realize the virtual reality experience. The other type mainly cooperates with a computer, the headpiece has a built-in optical system and a built-in display screen, and the computer serves to transmit video and audio signals to the display screen to display, for the user to watch the video.

The first type of virtual reality helmets, which adapt to a mobile phone, mainly have the following disadvantages:

1. Mobile phones have poor heat dissipation, and long-term watching of videos easily causes heating of the mobile phones;

2. Helmet body requires a built-in fan for heat dissipation, which has a large noise, which easily affects the effect of video watching;

3. The head of the user is required to bear the total weights of the helmet body and the mobile phone, long-term wearing easily causes fatigue, and the user's experience is poor;

4. Mobile phones have low resolutions, and the effect of video displaying is rather poor;

5. The power consumption of video playing by mobile phones is large, and charging is inconvenient when the headpiece is being worn; and 6. Mobile phones of different models or sizes may probably not adapt to a particular helmet body.

The second type of virtual reality helmets, which adapt to a computer, mainly have the following disadvantages:

1. The portability of computers is poor, which reduces the portability of the headpieces; and 2. The length of the video transmission line that connects the computer and the helmet body decides the range within which the user can move, which causes a big limitation.

SUMMARY

In view of the above problems, the present disclosure provides a virtual reality helmet and a virtual reality system, to solve the problems of the conventional virtual reality helmets including, when it cooperates with a mobile phone, the weight that the head of the user is required to bear is large; mobile phones of different models or sizes may probably not match a particular helmet body; and mobile phones have low resolutions and poor effects of video displaying.

To achieve the above objects, the technical solutions of the present disclosure are realized as follows:

In an aspect, the present disclosure provides a virtual reality helmet, comprising a helmet body and an optical system, the optical system being provided within the helmet body, wherein the helmet body is provided with a detachable display screen, and in operation the display screen is snap-fitted to the helmet body, connects to an external video playing device via a video transmission line, and displays video data of the video playing device; and the optical system is configured to image a light emitted by the display screen.

In some embodiments, the display screen comprises one or more video interfaces, the video interfaces comprise a mini HDMI interface, an MHL interface and a DP interface, the display screen connects to the external video playing device by using a video transmission line of any of the video interfaces, and receives video data transmitted by the external video playing device.

In some embodiments, the helmet body is provided with a Bluetooth module, the helmet body connects to the external video playing device via the Bluetooth module, and receives audio data and control data transmitted by the external video playing device.

In some embodiments, the helmet body is further provided with a plurality of sensor modules, the helmet body reports sensor data to the external video playing device via the Bluetooth module.

In some embodiments, the external video playing device comprises a portable mobile phone terminal and an un-portable personal computer terminal.

In another aspect, the present disclosure further provides a virtual reality system, comprising a virtual reality helmet, the virtual reality helmet comprising a helmet body and an optical system, the optical system being provided within the helmet body, wherein the virtual reality system further comprises a detachable display screen and an external video playing device, and in operation the display screen is snap-fitted to the helmet body, connects to an external video playing device via a video transmission line, and displays video data of the video playing device; and the optical system is configured to image a light emitted by the display screen.

In some embodiments, the display screen comprises one or more video interfaces, the video interfaces comprise a mini HDMI interface, an MHL interface and a DP interface, and the display screen connects to the external video playing device by using a video transmission line of any of the video interfaces, and receives video data transmitted by the external video playing device.

In some embodiments, the helmet body is provided with a Bluetooth module, the helmet body connects to the external video playing device via the Bluetooth module, and receives audio data and control data transmitted by the external video playing device.

In some embodiments, the helmet body is further provided with a plurality of sensor modules, the helmet body reports sensor data to the external video playing device via the Bluetooth module.

In some embodiments, the external video playing device comprises a portable mobile phone terminal and an un-portable personal computer terminal.

The advantageous effects of the present disclosure are: the present disclosure provides a virtual reality helmet and a virtual reality system, the main body of the virtual reality helmet is provided with a detachable display screen, and in operation the display screen is snap-fitted to the helmet body, connects to an external video playing device via a video transmission line, and displays the video data played by the video playing device. In an aspect, the video playing device is not attached to the helmet body, which largely reduces the weight worn on the head, and long-term usage does not easily cause neck fatigue. In another aspect, the display screen employs a displaying module having high resolution, which greatly improves the effect of video playing. Furthermore, the display screen provides a plurality of interfaces for the inputting of the video data of different mobile phone terminals and personal computer terminals to the display screen, which enhances adaptability.

DETAILED DESCRIPTION

In order to make the objects, the technical solutions and the advantages of the present disclosure clearer, the embodiments of the present disclosure will be described below in further detail in conjunction with the drawings.

The First Embodiment

Figure 1:
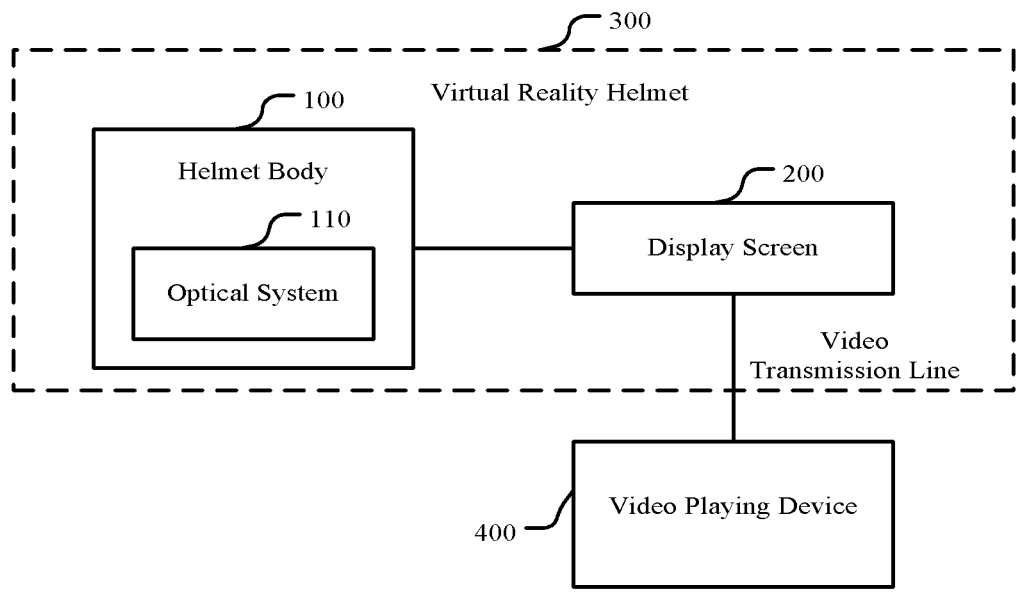
FIG. 1 is a schematic diagram of a virtual reality helmet of the first embodiment of the present disclosure.

As shown in FIG. 1, the first embodiment of the present disclosure provides a virtual reality helmet 300, which comprises a main body 100 of a headpiece and an optical system 110, the optical system 110 is provided within the helmet body 100. The helmet body 100 is provided with a detachable display screen 200. In operation, the display screen 200 is snap-fitted to the helmet body 100, connects to an external video playing device 400 via a video transmission line, and displays video data of the video playing device 400. The optical system 110 is configured to image a light emitted by the display screen 200, for the user to watch the video displayed by the display screen 200.

In some embodiments, the external video playing device 400 may be a portable mobile phone terminal Along with the rapid development of the CPU and GPU (Graphic Processing Unit) of mobile phones, the graphic processing capacity of mobile phones is increasingly strengthened, and mobile phones can currently play 4K videos. The solution of the embodiments of the present disclosure that the virtual reality helmet 300 is provided with a detachable display screen 200 flexibly solves the defect existed in the adaption of a mobile phone to a virtual reality helmet in the prior art. The external display screen 200 connects to the mobile phone, then is snap-fitted to the helmet body 100, and displays the video played by the mobile phone by the display screen 200. Therefore, the mobile phone is not attached to the helmet body 100, which largely reduces the weight worn on the head, and long-term usage does not easily cause neck fatigue. In some embodiments, the display screen may employ a displaying module having high resolution, the resolution of the display screen 200 is above 1920×1080, which has a higher displaying resolution than playing and displaying videos by using a mobile phone in the prior art, which greatly improves the effect of video playing, and improves the user experience.

Furthermore, the external video playing device 400 of the embodiments of the present disclosure may also be a personal computer terminal, which may be flexibly selected according to the different demands of users.

In some embodiments, the display screen 200 comprises one or more video interfaces, the video interfaces comprise a mini HDMI interface, an MHL interface and a DP interface. Mini HDMI interface, MHL interface and DP interface are video interfaces currently commonly used in mobile phone terminals and personal computer terminals. Certainly, other video interfaces may also be provided according to the requirements on the functions. The display screen 200 connects to the external video playing device 400 by using a video transmission line of any of the video interfaces, and receives video data transmitted by the external video playing device 400. The display screen 200 integrates the currently mainstream video interfaces in the market, provides a plurality of video interfaces for the inputting of the video data of different mobile phone terminals and personal computer terminals to the display screen 200, and can adapt to mobile phone terminals and personal computer terminals of different models, which enhances adaptability.

In a preferable embodiment of the present disclosure, the helmet body 100 is provided with a Bluetooth module, and the helmet body 100 connects to the external video playing device 400 via the Bluetooth module, and receives audio data and control data transmitted by the external video playing device 400.

The main body 100 of the embodiments of the present disclosure is further provided with a plurality of sensor modules, and the helmet body 100 reports the data detected by the sensor to the external video playing device 400 via the Bluetooth module.

The Bluetooth module can eliminate the complex data line connection between the video playing device and the virtual reality helmet, which facilitates the usage.

The Second Embodiment

Figure 2:
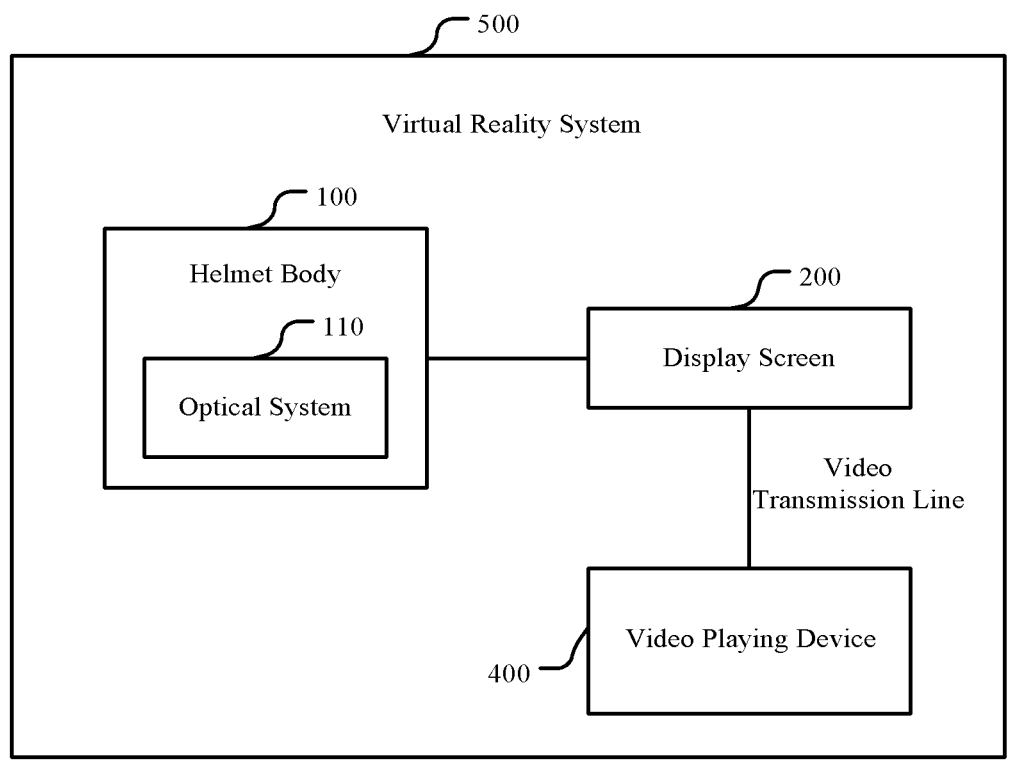
FIG. 2 is a schematic diagram of a virtual reality system of the second embodiment of the present disclosure.

As shown in FIG. 2, the second embodiment of the present disclosure provides a virtual reality system 500, comprising a virtual reality helmet 300, the virtual reality helmet 300 comprises a helmet body 100 and an optical system 110. The optical system 110 is provided within the helmet body 100. The virtual reality system 500 further comprises a detachable display screen 200 and an external video playing device 400. In operation, the display screen 200 is snap-fitted to the helmet body 100, connects to an external video playing device 400 via a video transmission line, and displays video data of the video playing device 400. The optical system 110 is configured to image a light emitted by the display screen 200, for the user to watch the video displayed by the display screen 200.

In some embodiments, the external video playing device 400 comprises a portable mobile phone terminal and an un-portable personal computer terminal, which may be flexibly selected according to the different demands of the user. The external video playing device 400 is not attached to the helmet body 100, which largely reduces the weight worn on the head, and long-term usage does not easily cause neck fatigue. In some embodiments, the display screen 200 may employ a displaying module having high resolution, the resolution of the display screen 200 is above 1920×1080, which has a higher displaying resolution than playing and displaying videos by using a mobile phone in the prior art, which greatly improves the effect of video playing, and improves the user experience.

In some embodiments, the display screen 200 comprises one or more video interfaces, the video interfaces comprise a mini HDMI interface, an MHL interface and a DP interface. Mini HDMI interface, MHL interface and DP interface are video interfaces currently commonly used in mobile phone terminals and personal computer terminals. Certainly, other video interfaces may also be provided according to the requirements on the functions. The display screen 200 connects to the external video playing device 400 by using a video transmission line of any of the video interfaces, and receives video data transmitted by the external video playing device 400. The display screen 200 integrates the currently mainstream video interfaces in the market, provides a plurality of video interfaces for the inputting of the video data of different mobile phone terminals and personal computer terminals to the display screen 200, and can adapt to mobile phone terminals and personal computer terminals of different models, which enhances adaptability.

In some embodiments, the helmet body 100 is provided with a Bluetooth module, and the helmet body 100 connects to the external video playing device 400 via the Bluetooth module, and receives audio data and control data transmitted by the external video playing device 400.

The helmet body 100 is further provided with a plurality of sensor modules, and the helmet body 100 reports the data detected by the sensor to the external video playing device 400 via the Bluetooth module.

The Bluetooth module can reduce the complex data line connection between the video playing device and the virtual reality helmet, which facilitates the usage.

In conclusion, the first embodiment and the second embodiment of the present disclosure provide a virtual reality helmet and a virtual reality system, the main body of the virtual reality helmet is provided with a detachable display screen, and in operation the display screen is snap-fitted to the helmet body, connects to an external video playing device via a video transmission line, and displays the video data played by the video playing device. In an aspect, the video playing device is not attached to the helmet body, which largely reduces the weight worn on the head, and long-term usage does not easily cause neck fatigue. In another aspect, the display screen employs a displaying module having high resolution, which greatly improves the effect of video playing. Furthermore, the display screen provides a plurality of interfaces for the inputting of the video data of different mobile phone terminals and personal computer terminals to the display screen, which can adapt to mobile phone terminals and personal computer terminals of different models, which enhances adaptability.

The above are only particular embodiments of the present disclosure. By the teaching of the present disclosure, a person skilled in the art can make other modifications or variations on the basis of the above embodiments. A person skilled in the art should appreciate that, the above specific descriptions are only for the purpose of better explaining the present disclosure, and the protection scope of the present disclosure should be determined by the protection scope of the claims.

What is claimed is:

1. A virtual reality helmet, comprising:
   a helmet body provided with a Bluetooth module; and
   an optical system provided within the helmet body;
   wherein the helmet body is provided with a detachable display screen, a resolution of the detachable display screen being above 1920×1080, and the detachable display screen comprising a plurality of video interfaces; and
   wherein, in operation, the display screen is snap-fitted to the helmet body, connects to an external video playing device via a video transmission line by using one of the plurality of video interfaces, directly receives video data transmitted by the external video playing device, and displays video data of the video playing device;
   wherein the optical system is configured to image a light emitted by the display screen, and simultaneously the helmet body connects to the external video playing device via the Bluetooth module, receives audio data and control data transmitted by the external video playing device, and plays synchronously the audio data of the video playing device; and
   wherein the external video playing device is a portable mobile phone terminal.

2. The virtual reality helmet according to claim 1, wherein the plurality of video interfaces comprise at least one of a mini High Definition Multimedia Interface (HDMI), a Mobile High-Definition Link (MHL) interface and a Display Port (DP) interface.

3. The virtual reality helmet according to claim 1, wherein the helmet body is further provided with a plurality of sensor modules, the helmet body reports sensor data to the external video playing device via the Bluetooth module.

4. A virtual reality system, comprising:
   a virtual reality helmet comprising a helmet body provided with a Bluetooth module; and
   an optical system provided within the helmet body
   wherein the virtual reality system further comprises a detachable display screen and an external video playing device, a resolution of the detachable display screen is above 1920×1080, and the display screen comprises a plurality of video interfaces; and
   wherein, in operation, the display screen is snap-fitted to the helmet body, connects to an external video playing device via a video transmission line by using one of the video interfaces, directly receives video data transmitted by the external video playing device, and displays video data of the video playing device;
   wherein the optical system is configured to image a light emitted by the display screen, and simultaneously the helmet body connects to the external video playing device via the Bluetooth module, receives audio data and control data transmitted by the external video playing device, and plays synchronously the audio data of the video playing device; and
   wherein the external video playing device is a portable mobile phone terminal.

5. The virtual reality system according to claim 4, wherein the plurality of video interfaces comprise at least one of a mini High Definition Multimedia Interface (HDMI), a Mobile High-Definition Link (MHL) interface and a Display Port (DP) interface.

6. The virtual reality system according to claim 4, wherein the helmet body is further provided with a plurality of sensor modules, the helmet body reports sensor data to the external video playing device via the Bluetooth module.

* * * * *